United States Patent Office 3,164,550
Patented Jan. 5, 1965

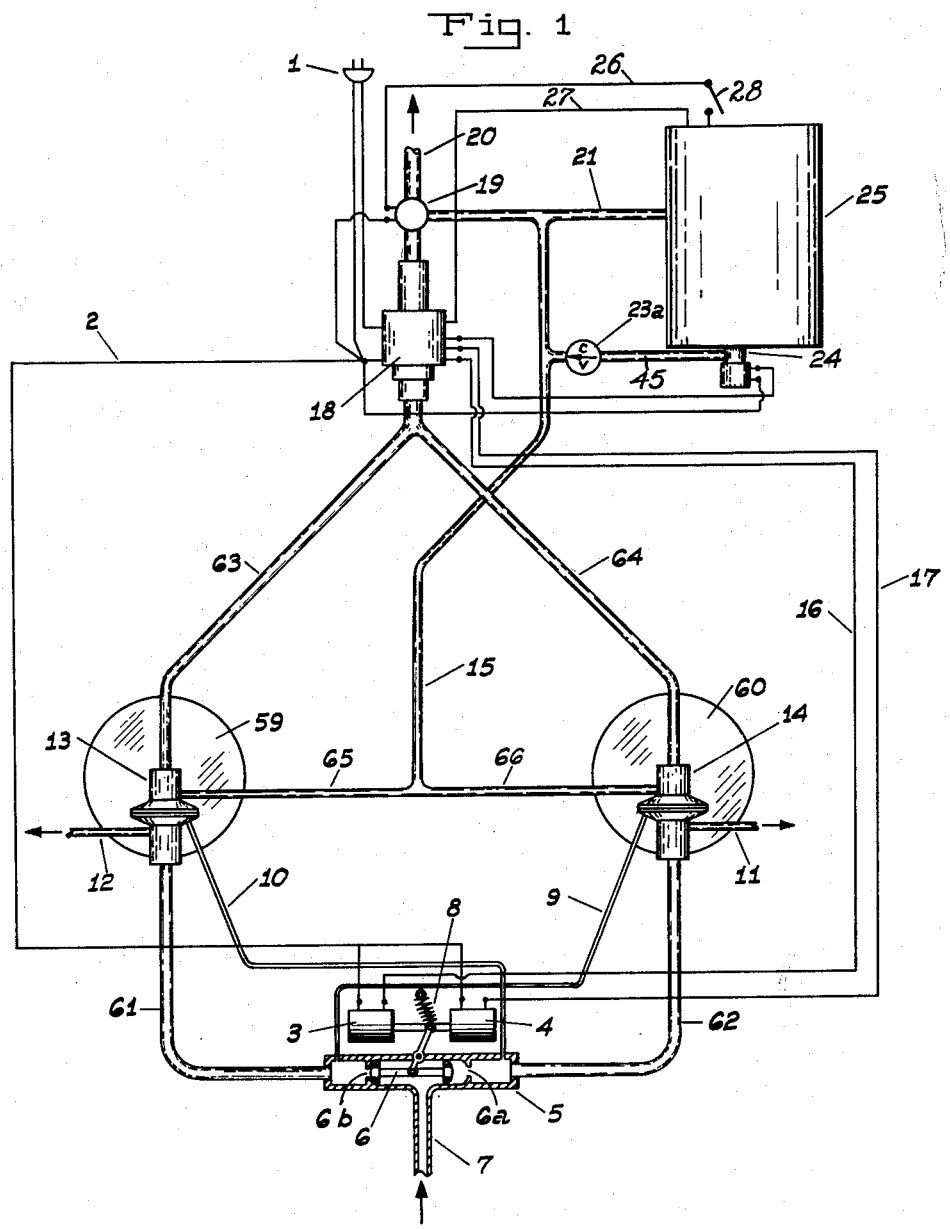

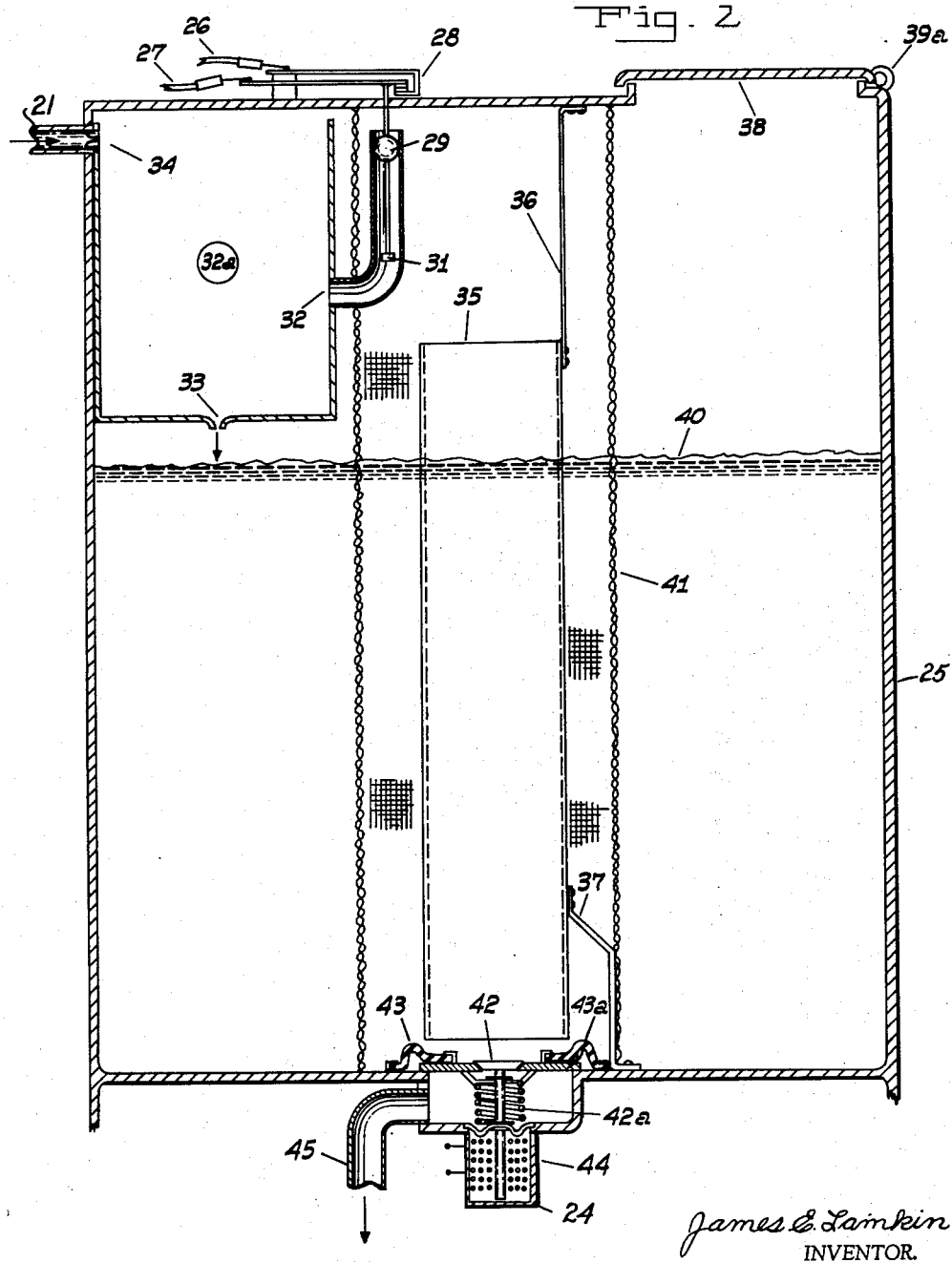

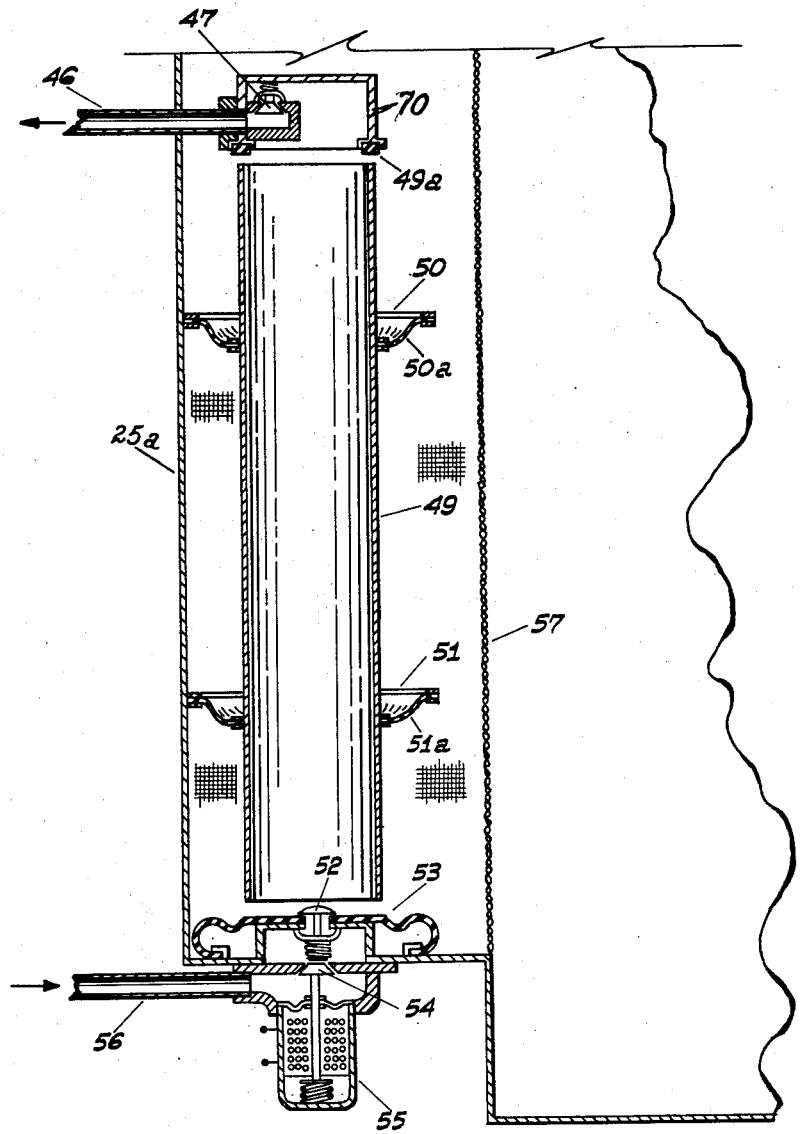

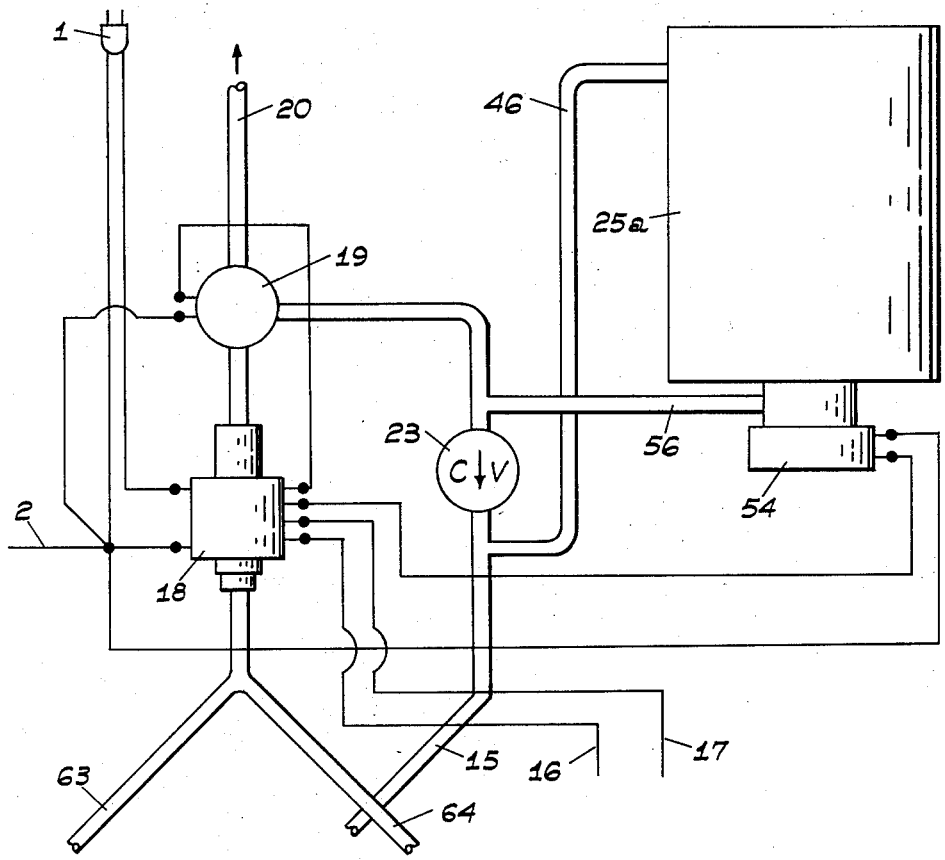

3,164,550
APPARATUS FOR SOFTENING WATER
James E. Lamkin, 5169 E. 27th Place, Tulsa, Okla., assignor of thirty-five percent to Wiley W. Lowrey, Jr., and William M. Majors, Jr., jointly, and five percent to Marion E. Lamkin, all of Oklahoma City, Okla.
Filed Aug. 29, 1961, Ser. No. 134,750
7 Claims. (Cl. 210—89)

This invention relates to the act of softening water and, more particularly, it relates to an improved apparatus for use in softening water. Even more particularly, it relates to using such apparatus whereby the water may be softened automatically, ecomonically, efficiently and provide a continuous supply of soft water.

As is well known to those skilled in the art, all water from whatever source contains certain materials as impurities which make the water more or less hard. This is true even of rain water. This hardness varies from less than one grain for rain water to many grains per gallon for water from numerous wells. It is also well known that hardness in water is objectionable for both economic and health reasons.

Because of the numerous advantages of soft water over hard water, various methods have been proposed for softening water. These methods have included the employment of certain compositions which may be added directly to the water by the consumer and those employing an ion exchange material. In the latter method, which is more satisfactory, the calcium and magnesium ions (the cause of hardness in water) are exchanged for sodium ions. The ultimate result is that calcium and magnesium salts are converted to sodium salts. Although the use of an ion exchange resin as heretofore employed is the preferred method of the two, it is not entirely satisfactory. This is true because the ion exchange resin becomes exhausted after a certain volume of water flows through it and must be regenerated which is accomplished by treating the exhausted resin with a sodium chloride solution followed by washing with fresh water to remove excess sodium chloride. Such a procedure is rather complicated and time consuming.

In an attempt to overcome the foregoing disadvantages automatic means for accomplishing the water cycle of operation including the three stages of from service to regeneration, from regeneration to backwash and from backwash back to service have been proposed. When such means are used all that is required of the consumer is to add salt periodically to a hopper. While such automatic means have been used rather extensively the results obtained thereby are neither economical nor efficient. This is true because in these automatic methods a clock, after a certain predetermined period, shuts off the water flow to the water softener and controls the regeneration and backwash cycles after which the softener is returned to the water softening cycle. This time interval is only approximately related to the actual water usage which is the actual factor determining when the ion-exchange resin requires regeneration. The usual practice is to have a bed of ion-exchange resin of such size that regeneration is relatively infrequent, on the order of once a week. The timer is set such that it will effect regeneration in a low use period such as the early hours of the morning. While regeneration is taking place, untreated water is bypassed to serve any demand that might occur. Provision is made for increasing the frequency of regeneration by changing settings on the timer in one day increments. Thus, where the capacity of the water softener is designed for an 8-day normal regeneration cycle, it may have 8 settings whereby the frequency of regeneration may be increased from once in 8 days to once daily. This arrangement is not entirely satisfactory and is wasteful. If the softener is set so that it is regenerated before the ion-exchange resin is spent under any rate of water use, then when normal or low use periods occur, salt is wasted. If on the other hand, it is set to regenerate after a normal period of use, then occasionally hard water will pass the spent softener bed after an abnormal use period and will cause dissatisfaction.

Soft water requires less detergent for washing, shorter cooking time, and less coffee and tea to give the same strength as hard water. So much so, that a few grains rise in water hardness per gallon, after becoming adjusted to using soft water, will disrupt household operations. Further since once hard water is allowed to enter the system it requires a long period of time before the hardness is reduced to a satisfactory level by dilution. It is, therefore, very desirable that this condition not be allowed to occur. It is possible to have two tanks which are alternately used thereby being able to effect regeneration at any time. But without a more accurate means of taking into account water usage than that offered by the present timer and without some means of compensation for fluctuations in usage, no distinct advantage is realized from such an arrangement.

It is, therefore, a principal object of my invention to provide a control for use with a water softening apparatus which obviates the disadvantages of the prior art devices of this character.

It is another object of this invention to provide a control for use with a water softening apparatus whereby the water softening process may be carried out in a simple and economical manner.

It is another object of the present invention to provide a control for use with a water softening apparatus whereby the water softening cycle of operation is dependent upon the volume of water passing through the water softening apparatus.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIGURE 1 is a schematic diagram of a complete water softening apparatus constructed in accordance to the invention;

FIGURE 2 is an elevational view in section of the gravity brine supply tank and appurtenances employed in conjunction therewith;

FIGURE 3 is an elevational view in section of the positive displacement brine supply tank and appurtenances employed in conjunction therewith; and FIGURE 4 is a partial schematic diagram illustrating an alternate apparatus from that shown in FIGURE 1 also constructed in accordance with the invention.

In brief, the foregoing objects and advantages are attained by an apparatus which operates broadly as follows: A predetermined volume of unsoftened water (volume of water previously found to be sufficient to substantially exhaust the resin contained in each of the two tanks) is allowed to flow through a first tank containing an ion exchange resin. After that quantity of water has flowed through the first tank, the flow of unsoftened water is directed through a second tank containing an ion exchange resin. During the period of time in which unsoftened water is flowing through the second tank, a series of operations occur in the first tank. Firstly, the water in the first tank is replaced with an aqueous sodium chloride solution. Secondly, after a predetermined time which prior experiments have indicated to be a sufficient length of time to reactivate the resin the salt solution is withdrawn from the first tank. Thirdly, excess sodium chloride is removed from tank one by flushing with water. When an equal volume of unsoftened water has flowed through tank two as flowed through tank one the flow of unsoftened water is directed through tank one. The resin in tank two is then reactivated as described above under tank one. Provision is made whereby the water softening resin regeneration cycle alternates between tanks one and two.

Referring to the drawings in detail, there is shown in FIGURE 1 a source of hard water at 7, a selector valve 5 which provides the means by which the flow of hard water may be directed to flow through either of the containers or tanks 59 and 60 which contain the ion exchange resin through lines 61 and 62 respectively. The numeral 25 indicates a gravity flow container for holding the salt supply and brine solution which are used for regenerating the resin. Provision is made in container 25 whereby the salt is mixed with water to form a brine solution which then can be added to either tank 59 or 60 through line 15 and then through either line 65 or 66, as the case may be, when regeneration is required. Items 13 and 14 indicate, in general, two-way hydraulic actuated valves. The necessary drain lines from the two tanks are indicated by the numerals 11 and 12. Soft water from the individual tanks for use flows as follows: From tank 59 through line 63 through control flowmeter 18 to the service line 20. If tank 60 is used for softening water, the flow of soft water is similar in that the soft water flows through line 64 through control flowmeter 18 to the service line 20. The numeral 1 indicates a source of electrical energy for operating the various solenoids.

Referring to FIGURE 2 there is shown a gravity flow salt container 25. The container 25 includes a centrally disposed cylindrical body 35 mounted in the container 25 by means of members or supports 36 and 37. A screen 41 surrounds the body 35 serving to separate it from the remainder of the container 25. The screen 41 should be of sufficiently small mesh to prevent salt in solid form from passing therethrough. Container 25 also includes a brine make-up measuring tank 32a positioned within and near the topmost portion of the container 25. An access door or lid 38 is provided in the top of the container 25 whereby salt can be added thereto as required. Lid 38 is so located that salt introduced therethrough will enter container 25 between the screen 41 and the wall of container 25.

A solenoid-actuated brine supply valve 24 is rigidly mounted on the bottom of the conatiner 25. It is mounted directly beneath and operates in conjunction with body 35. The valve 24 includes a solenoid 44 actuated by the control 18, a spring 42a, a flexible diaphragm 43, a valve stem 42, and a valve seat 43a. The valve 24 is electrically connected with the control 18 by means of the circuit shown in FIGURE 1.

An outlet pipe 45 is operably connected with the valve 24 whereby brine can be discharged from the container 25 when the valve 24 is in an open position. Outlet pipe 45 is connected at its other end to the line 15. A check valve 23a is located in pipe 45 whereby brine can flow from container 25, but prevents flow in the opposite direction, particularly during the backwashing cycle.

A water inlet pipe 21 enters the container 25 near its topmost end carrying supply water from the valve 19 and emptying directly into the make-up tank 32a. The tank 32a is provided with a curved tube 32 in fluid communication therewith. Tube 32 curves upwardly into a straight upper portion which has mounted therein a float member 29. Float member 29 is provided with a guide 31 and is connected to switch 28 which is mounted on the container 25. Switch 28 is connected in series with the control 18 by means of lead wires 26 and 27.

FIGURES 3 and 4 illustrate an alternate arrangement of the water softening system illustrated in FIGURES 1 and 2. In the alternate system of FIGURES 3 and 4, a positive displacement type brine container 25a is utilized. The important details of construction of the container 25a are shown in FIGURE 3.

Container 25a includes a section 58 which is separated from a tubular open-ended brine supply cylinder 49 by a screen 57. Salt from which the brine is formed is placed in section 58. The screen 57 is constructed of a mesh sufficiently small to prevent the salt not in solution from passing therethrough.

Cylinder 49 is movably retained in the container 25a by flexible members 50a and 51a which are fixed to container 25a by means of support brackets 50 and 51, respectively. Mounted in the bottom of container 25a, immediately below cylinder 49, is a valve 54 actuated by solenoid 55. Solenoid 55 is controlled and actuated by the control 18. Water inlet pipe 56 connects valve 54 with a source of soft water.

Valve 54 includes a valve member that controls the flow of water into a flexible seat or diaphragm 53. Centrally mounted in the flexible seat 53 is a spring-loaded check valve 52. The check valve 52 is so constructed that water can only flow upwardly therethrough. Flexible seat 53 is attached to the bottom of container 25a.

A head or chamber 70 is mounted in container 25a immediately above the cylinder 49. A resilient seat 49a is positioned in the head 70 so that it is adapted to engage and form a seal with the upper end of cylinder 49. An outlet pipe 46 is connected at one end to the head 70 and at the other end to a pipe 15. A check valve 47 is located in the head 70 in such a position that fluid can pass into pipe 46 but cannot flow in the other direction.

As can readily be seen in FIGURE 4, outlet pipe 46 is connected at its opposite end to pipe 15 downstream from a check valve 23. Check valve 23 is adapted to permit flow from the valve 19 but to prevent flow in the reverse direction. Check valve 23 is biased with a spring of sufficient strength to prevent flow therethrough in the normal direction (as indicated by the arrow) when valve 55 is open.

Fresh untreated water and by untreated I mean unsoftened hard water enters the apparatus through pipe 7. From pipe 7 water flows through the selector valve 5, through either tank 59 or 60 depending upon the setting of valve 5 through the control flowmeter 18 and pipe 20 to service. When the apparatus is initially installed the general practice is to fill or partially fill each of the two containers or tanks 59 and 60 with a regenerated ion exchange resin. When the control flowmeter 18 has measured a volume of water flow such that the resin in the container being used, for example tank 60, is substantially spent an electrical switch is closed in control 18 causing solenoid 3 to be actuated causing valve stem 6 to move to the right against seat 6a closing line 62 and line leading to valve 14. At the same time valve stem 6 is removed from seat 6b and line 61 is opened to valve 13. In other words this action causes the flow of untreated water to be switched from flowing through tank 60 to tank 59. When water is allowed to flow through line 61 water pressure is built up in line 9 which is connected to the two-way hydraulic valve 14. This valve is actuated causing it to open the tank to the brine supply and backwash line 66 and close the outlet to line 64. At the same time the tank outlet to the drain line 11 is opened. The reduction in pressure and opening to drain on the spent tank side of the selector valve 5 allows the pressure which was actuating the two-way hydraulic actuated valve 13 on the fresh tank 59 to be released allowing the tank inlet to be opened to water supply 61 and closing the opening to drain line 12. At the same time, the tank outlet is opened to discharge softened water through control flowmeter 18 to the water user. Concurrently, the control 18 closes off the opening to the brine supply and backwash line 65. During the time that the spent tank is opened to drain, the control 18 closes a switch which energises then solenoid 44 opening the brine supply valve 24 allowing the brine contained in the cylinder 35 to flow into the spent tank 60. After a period of time (usually 30 to 60 minutes) measured by the interval required for approximately 100 gallons of water to pass through the control 18 a switch is closed which energises a solenoid opening the backwash and makeup valve 19 allowing softened water to backflush the regenerated resin. The time of backwash is measured by the time required to replace the water taken from the salt supply in the case of a gravity brine supply; and by control 18 in the case of a positive displacement brine supply.

The operation of the gravity brine supply may be described as follows: When the control 18 actuates the solenoid 44 of the brine supply valve 24, the valve stem 42, spring 42a, and flexible seat 43 and move up sealing off the brine supply cylinder 35 from the rest of the tank. The valve stem continues to move up overpowering spring 42a opening the valve allowing the brine in the brine supply cylinder to flow through line 45, check valve 23a, and lines 15 and lines 65 and 66 to the spent tank of the softener displacing the water in the tank. After an interval of time sufficient to allow the quantity of brine to flow into the tank has passed, control 18 releases the solenoid allowing the brine supply valve 24 to resume its normally closed position. After a minimum of 30 to 60 minutes, control 18 actuates a solenoid which opens valve 19 to the brine supply and backwash line 15, this allows water to flow through the regenerated tank flushing out the brine solution and backflushing the softener bed. At the same time water is flowing into the brine makeup measuring tank 32a through orifice 34. The time of backwashing is determined by time required to fill the brine makeup measuring tank 32a. When full, float valve 29 opens switch 28 which is in series with the solenoid which opened the valve 19 to the brine supply and backwash line. Opening of the switch 28 causes the valve 19 to close to the backwash and make-up line stopping the backwashing operation. The water in the brine makeup measuring tank empties slowly into the salt storage tank through orifice 33.

If a positive displacement method of operation is used the procedure may be described as follows: When control 18 actuates the solenoid 55 of the brine supply valve 54 and at the same time the brine makeup and backwash valve solenoid 19, flow enters underneath the flexible seat 53 forcing it up to seat against the bottom of the brine supply cylinder 49. Cylinder 49 moves upwardly in the flexible supports 50a and 51a against the resilient seat 49a in the head sealing off the brine supply cylinder from the rest of the salt storage tank 25a. Water pressure then overcomes the spring of the check valve 52 allowing water to enter the brine supply cylinder 49 displacing the brine solution contained therein into the head 70. The brine then passes through the check valve 47 into outlet pipe 46 and through line 15 to the spent softener tank. Control 18 is set to allow just sufficient flow to displace the brine in the brine supply cylinder. The circuit is then broken and the brine supply valve 54 closes and the brine supply cylinder slowly resumes its original position as water trapped under the flexible seat leaks past the check valve through a small orifice. When the control 18 opens the brine makeup and backwash valve 19, but not the brine supply valve 54, then water flows to the softener tank backwashing the bed. In doing this it overpowers check valve 23 in the brine supply and backwash line. The strength of the spring of this check valve is such that when the brine supply valve is open the path of flow is through the brine supply cylinder.

As a modification of the positive displacement method of operation as described above fresh water can be added at the top of tank 49. In this modification the resilient mountings 50a and 51a would be replaced by spring supports tending to hold the tank in the upward position. Seals 49a and 53 would be in effect reversed. Since the necessary modifications to accomplish this result will be apparent to those skilled in the art, no further description will be given.

While particular embodiments of the invention have been described, it will be understood, of course, that the invention is not limited thereto since many modifications will be apparent to those skilled in the art. As one example, the type of control used is not necessarily limited to the flowmeter illustrated. Other suitable types will be readily apparent to those skilled in the art. It is, therefore, contemplated to cover by the appended claims any such modifications as fall within the true spirit and scope of the invention.

The invention having thus been described, what is claimed and desired to be secured by Letters Patent is:

1. A water softening apparatus comprising: a water source, two containers containing an ion exchange resin, a selector valve for allowing water from said water source to flow through said containers selectively, two hydraulically-actuated valves each being connected with one of said containers and adapted to be actuated by said selector valve, an outlet line in communication with each hydraulically-actuated valve, said outlet lines being connected to form a single outlet pipe, a brine solution source, control means and responsive to a predetermined quantity of water flowing therethrough to actuate said selector valve whereby after said predetermined quantity of water has passed through one of said containers said selector valve is activated and said water is caused to pass through said other container and a predetermined quantity of aqueous sodium chloride solution is caused to flow into said first mentioned container, means for draining said sodium chlroide solution from said first mentioned container after a predetermined time, means for removing excess sodium chloride from said first mentioned container, said control means being arranged for reactivating said selector valve after said predetermined quantity of water has passed through said second container whereby the flow of water is directed to pass through said first mentioned container and a predetermined quantity of aqueous sodium chloride is caused to flow into said second mentioned container, means for draining said sodium chloride solution therefrom after a predetermined time, means for removing excess sodium chloride therefrom and means for repeating the water softening-resin reactivation cycle alternately with containers one and two.

2. In water softening apparatus
  (1) a water supply source,
  (2) a selector valve in fluid communication therewith,
  (3) a pair of containers having an ion exchange resin therein,
  (4) first and second hydraulically-actuated valves,
    (4a) each connected with one of said containers, and
    (4b) each connected with said selector valve and adapted to be actuated thereby,
  (5) control means responsive to a predetermined quantity of water flowing therethrough adapted to actuate said selector valve,
  (6) conduit means connecting said control means with each said hydraulically-actuated valve,
  (7) a water outlet pipe connected with said control means, and
  (8) a brine supply tank adapted to be in fluid communication with said outlet pipe and with each hydraulically-actuated valve, said brine supply tank including
    (8a) valve means operably associated with said control means, and
    (8b) means for isolating and dispensing a predetermined quantity of brine therefrom.

3. In a brine supply tank for use in a water softening system, said tank including:
(1) a container member having
    (1a) a bottom,
    (1b) side walls, and
    (1c) a top cover,
(2) said container member also having an opening therein whereby salt and water may be placed therein,
(3) valve means extending through said bottom,
(4) an outlet pipe connected with said valve means,
(5) an inlet pipe extending into said container member,
(6) a hollow cylindrical member mounted inside said container member, said cylindrical member having an open lower end in communication with the interior of said container member and positioned above said valve means, whereby the interior thereof is in communication with the interior of said container member,
(7) a flexible seal on said valve means engageable with the lower end of said cylindrical member to isolate the interior thereof from the interior of said container member,
(8) means actuating said valve means to move said seal into engagement with said cylindrical member and to open said valve means whereby fluid can flow from the interior of said cylindrical member into said outlet pipe, and
(9) a screen mounted in said container member and separating said cylindrical member and valve means from the remainder of said container member, said screen being formed of sufficiently fine mesh to permit brine solutions to pass therethrough, but to prevent undissolved salt from passing therethrough.

4. In a brine supply tank for use in a water softening system, said tank including:
(1) a container member having,
    (1a) a bottom,
    (1b) side walls, and
    (1c) a top cover,
(2) said container member also having an opening therein whereby salt and water may be placed therein,
(3) valve means extending through said bottom,
(4) an inlet pipe connected with said valve means,
(5) a cylindrical member movably mounted in said container member above said valve means,
(6) the arrangement and construction of said cylindrical members being such that its interior is in communcation with the interior of said container member,
(7) a hollow chamber member mounted in said container member above said cylindrical member,
(8) said chamber member having its lower end open and adapted to sealably engage the upper end of said cylindrical member placing the interior of each in communication with the other,
(9) a flexible seal on said valve means adapted when said valve means is actuated to engage the lower end of said cylindrical member displacing said cylindrical member upwardly into engagement with said chamber member thereby isolating the interior of said cylindrical member from the interior of said container member,
(10) an outlet pipe connected with said chamber member and extending out of said container member, and
(11) a screen mounted in said container member and separating said cylindrical member and valve means from the remainder of said container member, said screen being formed of sufficiently fine mesh to permit brine solutions to pass therethrough, but to prevent undissolved salt from passing therethrough.

5. In water softening apparatus
(1) a water supply source,
(2) a selector valve in fluid communication therewith,
(3) a pair of containers having an exchange resin therein,
(4) first and second hydraulically-actuated valves,
    (4a) each connected with one of said containers,
    (4b) each connected with said selector valve and adapted to be actuated thereby,
(5) control means responsive to a predetermined quantity of water flowing therethrough adapted to actuate said selector valve,
(6) conduit means connecting said control means with each said hydraulically-actuated valve,
(7) a water outlet pipe connected with said control means, and
(8) a brine supply tank adapted to be in fluid communication with said outlet pipe and with each hydraulically-actuated valve, said brine supply tank including
    (8a) a bottom,
    (8b) side walls, and
    (8c) a top cover,
    (8d) said tank also having an opening therein whereby salt and water may be placed therein,
    (8e) valve means extending through said bottom,
    (8f) an outlet pipe connected with said valve means,
    (8g) an inlet pipe extending into said tank,
    (8h) a hollow cylindrical member mounted inside said tank and positioned above said valve means, the interior thereof being in communication with the interior of said tank, and
    (8i) a flexible seal on said valve means adapted when said valve means is actuated to engage said cylindrical member thereby isolating the interior thereof from the interior of said tank.

6. In a water softening apparatus
(1) a water supply source,
(2) a selector valve in fluid communication therewith,
(3) a pair of containers having an exchange resin therein,
(4) first and second hydraulically-actuated valves,
    (4a) each connected with one of said containers, and
    (4b) each connected with said selector valve and adapted to be actuated thereby,
(5) control means responsive to a predetermined quantity of water flowing therethrough adapted to actuate said selector valve,
(6) conduit means connecting said control means with each said hydraulically-actuated valve,
(7) a water outlet pipe connected with said control means, and
(8) a brine supply tank adapted to be in fluid communication with said outlet pipe and with each hydraulically-actuated valve, said brine supply tank including
    (8a) a bottom,
    (8b) side walls, and
    (8c) a top cover,
    (8d) said tank also having an opening therein whereby salt and water may be placed therein,
    (8e) valve means extending through said bottom,
    (8f) an inlet pipe connected with said valve means,
    (8g) a cylindrical member movably mounted in said tank above said valve means,
    (8h) the arrangements and construction of said cylindrical member being such that its interior is in communication with the interior of said tank,
    (8i) a hollow chamber member mounted in said tank above said cylindrical member,
    (8j) said chamber means having its lower end open and adapted to sealably engage the upper end of said cylindrical member placing the interior of each in communication with the other,
    (8k) a flexible seal on said valve adapted when said valve means is actuated to engage the lower end of cylindrical member displacing said cylindrical member upwardly into engagement with said chamber member thereby isolating the interior of said cylindrical member from the interior of said tank, and
  (8l) an outlet pipe connected with said chamber member and extending out of said tank.
7. In water softening apparatus
  (1) a water supply source,
  (2) a selector valve in fluid communication therewith,
  (3) a pair of containers having an ion exchange resin therein,
  (4) first and second hydraulically-actuated valves,
    (4a) each connected with one of said containers, and
    (4b) each connected with said selector valve and adapted to be actuated thereby,
  (5) control means responsive to a predetermined quantity of water flowing therethrough adapted to actuate said selector valve,
  (6) conduit means connecting said control means with each said hydraulically-actuated valve,
  (7) a water outlet pipe connected with said control means, and
  (8) a brine supply tank adapted to be in fluid communication with said outlet pipe and with each hydraulically-actuated valve, said brine supply tank including
    (8a) a container member adapted to hold a brine solution,
    (8b) means located in said container member for isolating a predetermined quantity of said brine solution,
    (8c) valve means operably associated with said isolating means adapted upon actuation to dispense said isolated brine solution into said water softening system.

References Cited by the Examiner
UNITED STATES PATENTS

| 1,495,317 | 5/24  | Caps    | 210—141 X |
| 1,693,820 | 12/28 | Sweeney | 210—190   |
| 1,846,419 | 2/32  | Harwood | 210—190   |
| 2,974,834 | 3/61  | Foote   | 222—518   |

REUBEN FRIEDMAN, *Primary Examiner.*

CARL F. KRAFT, HERBERT L. MARTIN, HARRY B. THORNTON, *Examiners.*